United States Patent
Saxena

(10) Patent No.: US 8,012,453 B2
(45) Date of Patent: *Sep. 6, 2011

(54) CARBON SEQUESTRATION AND PRODUCTION OF HYDROGEN AND HYDRIDE

(76) Inventor: Surendra Saxena, Miami, FL (US)

(*) Notice: Subject to any disclaimer, the term of this patent is extended or adjusted under 35 U.S.C. 154(b) by 165 days.

This patent is subject to a terminal disclaimer.

(21) Appl. No.: 12/258,886

(22) Filed: Oct. 27, 2008

(65) Prior Publication Data

US 2009/0202413 A1    Aug. 13, 2009

Related U.S. Application Data

(60) Provisional application No. 60/982,473, filed on Oct. 25, 2007.

(51) Int. Cl.
*C01D 5/00* (2006.01)
*C01B 3/02* (2006.01)
(52) U.S. Cl. .................................. 423/652; 423/648.1
(58) Field of Classification Search .................. 423/652
See application file for complete search history.

(56) References Cited

U.S. PATENT DOCUMENTS

| | | | |
|---|---|---|---|
| 3,786,138 A * | 1/1974 | Shalit et al. | 423/650 |
| 4,772,648 A | 9/1988 | Demangeon et al. | |
| 4,879,326 A | 11/1989 | Demangeon et al. | |
| 5,268,029 A | 12/1993 | Demangeon et al. | |
| 6,669,917 B2 | 12/2003 | Lyon | |
| 6,790,430 B1 | 9/2004 | Lackner et al. | |
| 6,821,501 B2 | 11/2004 | Matzakos et al. | |
| 6,911,057 B2 | 6/2005 | Lyon | |
| 7,083,658 B2 | 8/2006 | Andrus, Jr. et al. | |

(Continued)

FOREIGN PATENT DOCUMENTS

JP    2001 106503 A    4/2001

(Continued)

OTHER PUBLICATIONS

Saxena et al., Hydrogen production by chemically reacting species, International Journal of Hydrogen Energy, 2003, pp. 49-53, vol. 28 Issue 1, Elsevier Science Ltd.

(Continued)

*Primary Examiner* — Melvin Mayes
*Assistant Examiner* — Kenneth Vaden
(74) *Attorney, Agent, or Firm* — Todd L. Juneau; Jason Tiedeman

(57) ABSTRACT

This invention describes a complete sequestration of carbon ($CO_2$ and CO) from coal burning plants. In this process, hydrogen can be generated which in turn permits the reduction in the cost of hydride synthesis. The hydrides store hydrogen for on-board application for automobiles and fuel cells. Hydrogen generation and synthesis of hydrides is accomplished by using an integrated approach in which coal is used as a fuel and carbon is sequestered in the process. The CO and or $CO_2$ produced in coal burning power plants and the heat is used when available for producing hydrogen and hydrides. Carbon is used both as a reactant and as a fuel. Economically hydrogen production cost is comparable to or less than the current price of hydrogen produced from fossil-fuel with the added benefit of carbon sequestration and reducing global warming. Specific processes for synthesizing important hydrogen storage materials, hydrides are described. A hydrogen based automobile becomes viable as the cost of the hydrogen production and hydride synthesis is reduced. Although coal-burning power plant is specified here, any power plant, coal- or natural gas-burning, can be subjected to similar treatment.

5 Claims, 8 Drawing Sheets

U.S. PATENT DOCUMENTS

| | | |
|---|---|---|
| 7,282,189 B2 | 10/2007 | Zauderer |
| 7,596,952 B2 | 10/2009 | Fradette et al. |
| 2003/0027023 A1 | 2/2003 | Dutil et al. |
| 2004/0048369 A1 | 3/2004 | Lu et al. |
| 2004/0126293 A1 | 7/2004 | Geerlings et al. |
| 2005/0163705 A1* | 7/2005 | Reichman et al. ......... 423/648.1 |
| 2005/0163706 A1* | 7/2005 | Reichman et al. ............ 423/655 |
| 2006/0048517 A1 | 3/2006 | Fradette et al. |
| 2006/0185985 A1 | 8/2006 | Jones |
| 2007/0253886 A1 | 11/2007 | Abatzoglou et al. |
| 2009/0202413 A1* | 8/2009 | Saxena .......................... 423/277 |
| 2010/0028241 A1* | 2/2010 | Saxena ....................... 423/419.1 |

FOREIGN PATENT DOCUMENTS

| | | |
|---|---|---|
| WO | WO 2006/009600 | 1/2006 |
| WO | WO 2006/124120 | 11/2006 |
| WO | WO 2007/106372 | 9/2007 |
| WO | WO 2008/140821 | 11/2008 |

OTHER PUBLICATIONS

Saxena et al., A fossil-fuel based recipe for clean energy, International Journal of Hydrogen Energy, 2008, pp. 3625-3631, vol. 33 Issue 14, Elsevier Science Ltd.

Reichman et al., Progress in Development and Commercialization of Base-Facilitated Reforming Technology, Symposium paper, National Hydrogen Association Annual Hydrogen Conference 2008, Mar. 31, 2008, Sacramento, CA.

Reichman et al., Ovonic Renewable Hydrogen (ORH)—low temperature hydrogen from renewable fuels, International Journal of Hydrogen Energy, 2010, pp. 4918-4924, vol. 35 Issue 10, Elsevier Science Ltd.

Drozd et al., Hydrogen release from a mixture of NaBH4 and Mg(OH)2, International Journal of Hydrogen Energy, 2007, pp. 3370-3375, vol. 32 Issue 15, Elsevier Science Ltd.

Saxena et al., Synthesis of metal hydride from water, International Journal of Hydrogen Energy, 2007, pp. 2501-2503, vol. 32 Issue 13, Elsevier Science Ltd.

* cited by examiner

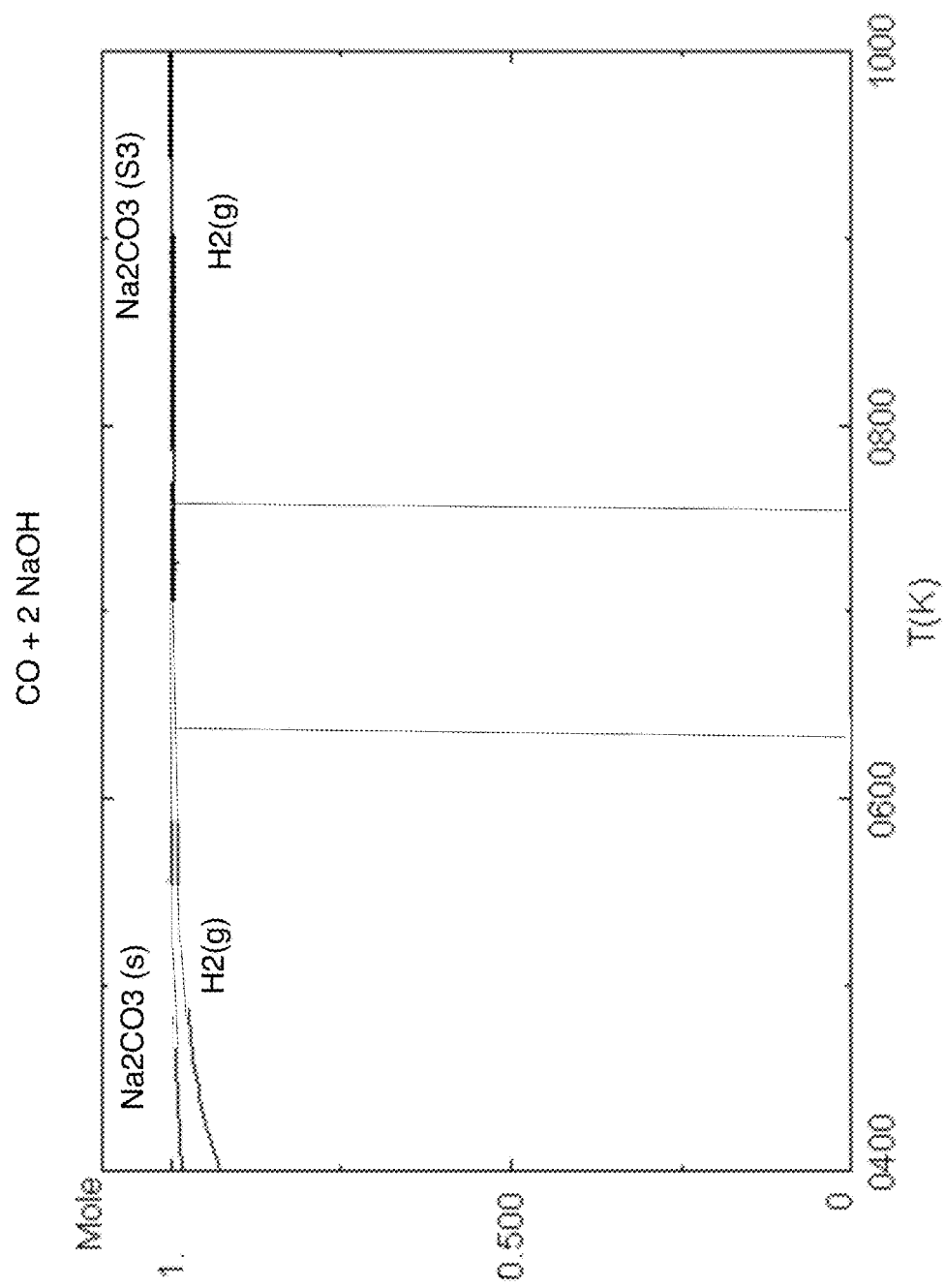

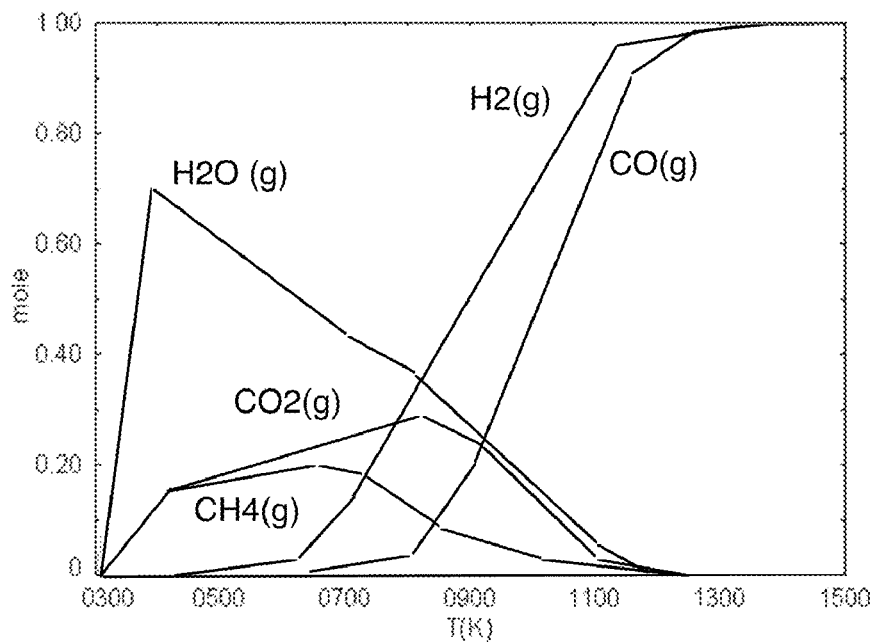
Fig. 2A: Equilibrium composition of $C + H_2O$.
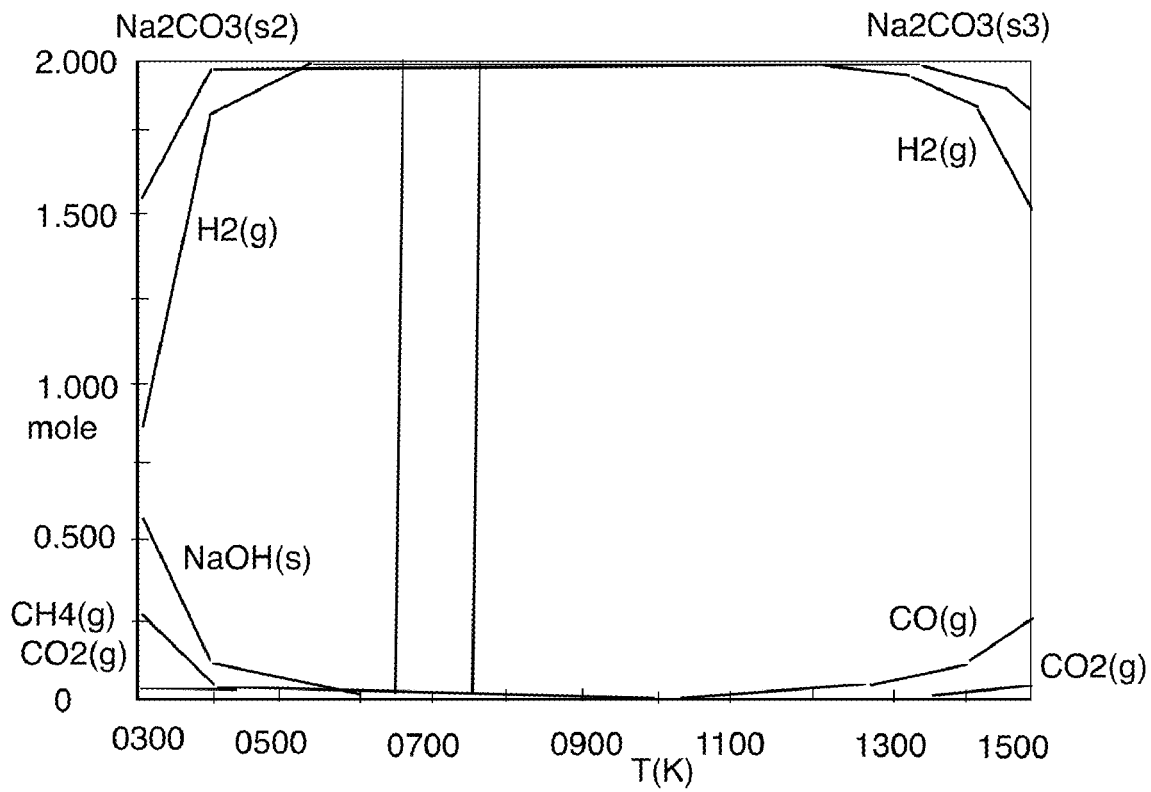
Fig. 2B. Equilibrium composition in the mixture $4\ NaOH+CO_2+C$.

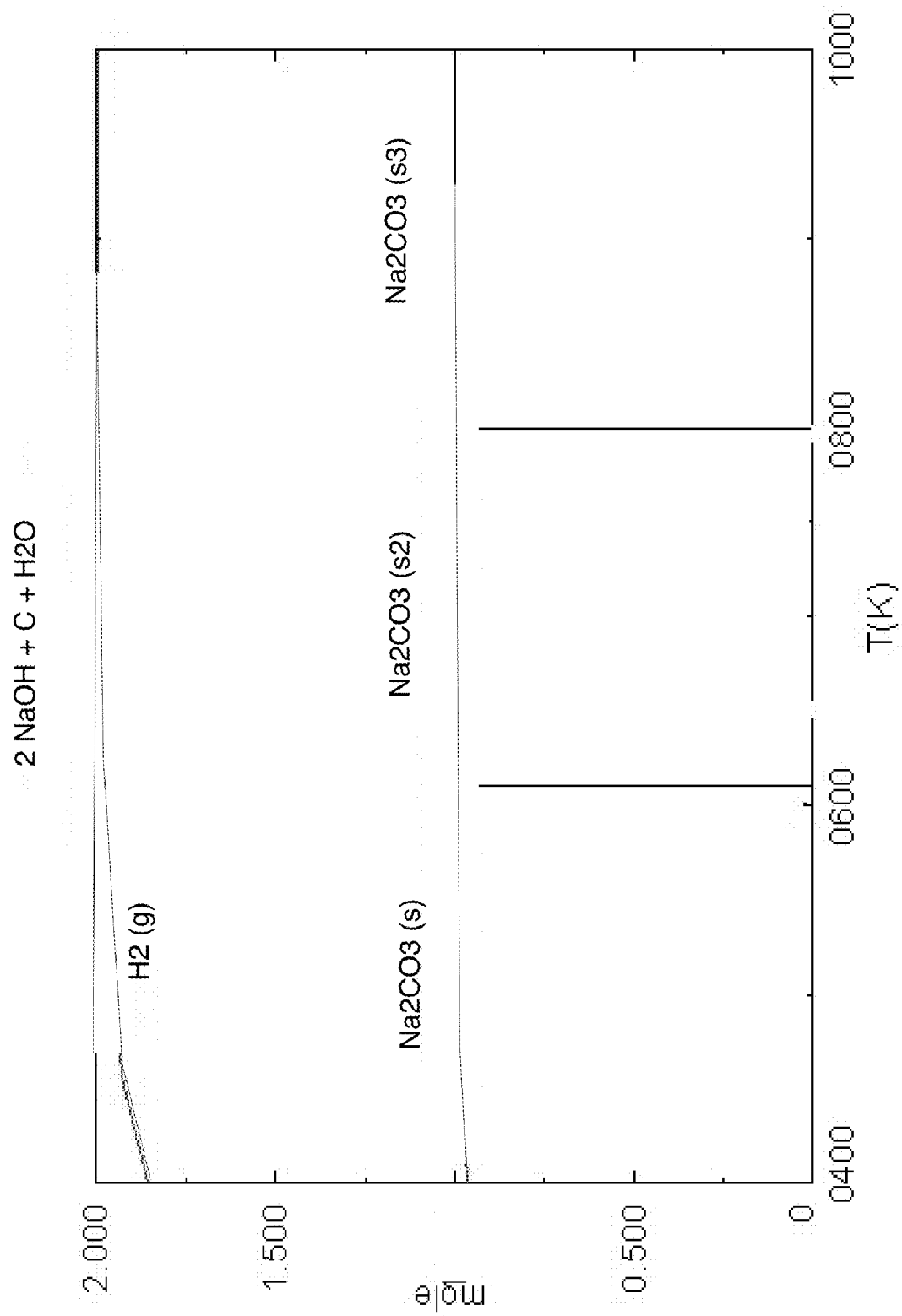

CARBON SEQUESTRATION AND PRODUCTION OF HYDROGEN AND HYDRIDE

CROSS REFERENCE TO RELATED APPLICATIONS

This application claims priority under 119(e) to U.S. Ser. No. 60/982,473 filed 25 Oct. 2008, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

REFERENCE TO A SEQUENCE LISTING

A table or a computer list appendix on a compact disc
[ ] is
[X] is not
included herein and the material on the disc, if any, is incorporated-by-reference herein.

FIELD OF THE INVENTION

The present invention relates to a system of processes for producing hydrogen gas that take advantage of emission of CO and $CO_2$ and heat from the coal-burning power plants. The hydrogen thus produced is used to synthesize hydrides at much reduced costs. The use of this invention will lead to carbon sequestration and reduce global warming. The invention is presented in two parts; part 1 deals with hydrogen production with carbon sequestration and part 2 with synthesis of hydrides for on-board hydrogen generation in automobiles.

BACKGROUND OF THE INVENTION

Steam methane reforming is the most common and the least expensive method to produce hydrogen at present. Coal can also be reformed to produce hydrogen, through gasification. Hydrogen production by $CO_2$-emitting-free methods are either more expensive compared to those ones using fossil fuel or are in the very early stages of development. Taking into account that United States has more proven coal reserves than any other country coal based technology of hydrogen production is the most attractive. However, effective and low cost carbon sequestration technology has to be developed.

Hydrogen is regarded as the energy for future but to produce and use hydrogen either by direct combustion or in a fuel cell, we need to use other sources of energy. Thus hydrogen or use of any material in producing energy cannot be an environmentally clean and economically viable solution unless we sequester carbon in economically viable way. The use of hydrogen is being promoted on a federal level with massive support from DOE and there is little doubt that we will soon have the hydrogen solution for our transportation and other energy uses. However, it is a sad fact that such energy will continue to be dependent on the use of fossil fuel for long time and may not be economic. To turn things around, we have to use alternate methods of using coal, producing hydrogen and hydrides. Many hydrides are currently under consideration for use in on-board generation of hydrogen and the cost of producing the hydride is an important consideration. This invention is unique because although we use carbon in producing hydrogen, the carbon is sequestered simultaneously as hydrogen is produced and hydrogen is reacted with suitable metals to produce hydrides.

Coal is used extensively in producing synthetic fuels. Use of coal in gasifiers is well established and hydrogen may be produced by the reaction: $C+2H_2O=CO_2+2H_2$. Gasifiers are operated between 800 and 1500 K, depending on the conditions involving steam, oxygen and/or air a mixture of $CO_2$, CO, $H_2$, $CH_4$ and water. The CO produced can be further processed by the shift-gas reaction to produce $H_2$ with production of $CO_2$: $CO+H_2O=CO_2+H_2$.

The following is an extract from "The Hydrogen Economy: Opportunities, Costs, Barriers, and R&D Needs (2004), National Academy of Engineering (NAE), Board on Energy and Environmental Systems (BEES)" and shows the importance of the present project:

"Carbon Emissions Associated with Current Hydrogen Production

At the present time, global crude hydrogen production relies almost exclusively on processes that extract hydrogen from fossil fuel feedstock. It is not current practice to capture and store the by-product $CO_2$ that results from the production of hydrogen from these feedstocks. Consequently, more than 100 Mt C/yr are vented to the atmosphere as part of the global production of roughly 38 Mt of hydrogen per year."

It would then appear that when coal is used in gasifiers or in direct burning in power- and other manufacturing-plants, $CO_2$ and CO are prominent among other gases. Their emission in the atmosphere is not only harming the environment but as considered here is also a waste of resources. For industry this has been an economic issue and someone else's problem. This invention will provide a clear economic incentive to sequester carbon ($CO_2$ and CO) without significantly affecting our current modes of operations. We consider several such processes below.

RELATED PATENTS

Carbon Sequestration

U.S. Pat. No. 7,132,090, D. Dziedzic, K. B. Gross, R. A. Gorski, J. T. Johnson,
Sequestration of carbon dioxide
U.S. patent application 20030017088, W. Downs and H. Sarv
Method for simultaneous removal and sequestration of $CO_2$ in a highly efficient manner
U.S. patent application 20010022952, G. H. Rau and K. G. Caldeira
Method and apparatus for extracting and sequestration carbon dioxide
U.S. Pat. No. 5,261,490, T. Ebinuma
Method for dumping and disposing of carbon dioxide gas and apparatus therefore
U.S. Pat. No. 6,667,171, D. J. Bayless, M. L. Vis-Morgan and G. G. Kremer
Enhanced practical photosynthetic CO2 mitigation
U.S. Pat. No. 6,598,407, O. R. West, C. Tsouris and L. Liang
Method and apparatus for efficient injection of CO2 in ocean
U.S. Pat. No. 5,562,891, D. F. Spencer and W. J. North
Method for the production of carbon dioxide hydrates
U.S. Pat. No. 5,293,751, A. Koetsu Method and system for throwing carbon dioxide into the deep sea U.S. Pat. No. 6,270,731, S. Kato, H. Oshima and M. Oota Carbon dioxide fixation system U.S. Pat. No. 5,767,165, M. Steinberg and Y. Dong Method for converting natural gas and carbon monoxide to methanol and reducing CO2 emission U.S. Pat. No. 6,987,134, R. Gagnon How to convert carbon dioxide into synthetic hydrocarbon through a process of catalytic hydrogenation called CO2hydrocarbonation Hydride U.S. Pat. No. 5,958,098: Method and composition in which metal hydride particles are embedded in a silica network.

U.S. Pat. No. 5,308,553: Metal hydride compositions and methods.

U.S. Pat. Nos. 5,514,353 and 5,833,934: Demand responsive hydrogen generator based on hydride water reaction.

U.S. Pat. No. 20040258613: Process for the production and purification of sodium hydride.

U.S. Pat. No. 20050053547: Method for activating metal hydride material.

U.S. Pat. No. 20020100682: Hydrogen recharging system for fuel cell hydride storage reservoir.

U.S. Pat. No. 20030014917: Chemical hydride hydrogen generation system and an energy system incorporating the same.

U.S. Pat. No. 20040166057: Powder metal hydride hydrogen generator.

U.S. Pat. No. 20050058595: Reactor and method for generating hydrogen from a metal hydride.

U.S. Pat. No. 6,143,270: anhydrous magnesium chloride

U.S. Pat. No. 5,665,220: Electrolytic magnesium production

U.S. Pat. No. 6,372,017: Method for producing magnesium

U.S. Pat. No. 5,782,952: Method for producing magnesium

U.S. Pat. No. 4,720,375: Process for producing magnesium oxide

U.S. Pat. No. 5,162,108: Method for preparing active magnesium hydride

U.S. Pat. No. 6,433,129, Amendola, S. C.; Kelly, M. T. "Compositions and Processes for Synthesizing Borohydride Compounds 2002.

U.S. Pat. No. 6,670,444, Amendola, S. C.; Kelly, M. T.; Ortega, J. V.; Wu, Y. "Process for Synthesizing Borohydride Compounds", 2003.

U.S. Pat. No. 6,524,542, Amendola, S. C.; Kelly, M. T.; Wu, Y. "Process for Synthesizing Borohydride Compounds", 2003.

Ortega, J. V.; Wu, Y.; Amendola, S. C.; Kelly, M. T. "Processes for Synthesizing Alkali Metal Borohydride Compounds" U.S. Pat. No. 6,586,563, 2003.

U.S. Pat. No. 2,469,879, Hurd, D. T. "Preparation of Boron Compounds", 1949.

U.S. Pat. No. 2,596,690, Hurd, D. T. "Preparation of Boron Compounds", 1952.

DE Patent 1095797, Jenkner, H. "Process for the Production of Boron Hydrides", 1960.

GB Patent 907462, Jenkner, H. "Improvements in or relating to the Manufacture of Boron Hydrides and Boron Hydrides containing Organic Substituent Radicals", 1960.

JP Patent 2002-193604, Kojima, Y.; Haga, T.; Suzuki, K.; Hayashi, H.; Matsumoto, S.;

Nakanishi, H. "Method for Manufacturing Metal Borohydride", 2002

U.S. Pat. No. 3,734,842, Cooper, H. B. H. "Electrolytic Process for the Production of Alkali Borohydrides", 1973.

CN Patent Appl. 1396307A, Sun, Y.; Liang, Z. "Electrochemical Process for Preparing Borohydride", 2003.

JP Patent 2002-173306, Suda, S. "Method of Manufacturing Metal Hydrogen Complex Compound", 2002.

DE Patent 1108670, Broja, G.; Schlabacher, W. "Process for the Production of Alkali Metal Borohydrides", 1959.

DE Patent 1067005, Schubert, F.; Lang, K.; Schlabacher, W. "Process for the Production of Borohydrides", 1959.

JP Patent, Haga, T.; Kojima, Y. "Method for Manufacturing Metal Borohydride" 2002-241109, 2002.

SUMMARY OF THE INVENTION

The present invention provides a system of reactions to produce hydrogen from sodium hydroxide and CO or $CO_2$ and carbon. The carbon gases are produced in industrial plants burning coal and thus available at no cost. These gases also can be obtained at relatively high temperature; the reaction of CO or $CO_2$ with sodium hydroxide is exothermic and hence no additional heating would be required. The CO or $CO_2$ would react to from sodium carbonate and thus carbon will be sequestered.

Another embodiment of the present invention provides the production of hydrogen if the industrial CO or $CO_2$ is not available. In such a case, sodium hydroxide reacts with water and carbon producing hydrogen and no carbon is released in the environment.

In yet another embodiment of the invention, the hydrogen produced cheaply with no carbon release in the atmosphere is used to synthesize hydrides at low cost. Magnesium hydride is produced by direct reaction with powdered magnesium and the hydrogen produced in previous embodiments. It may also be produced by a reaction among powdered magnesium, water and hydrogen (produced as described above or from other sources).

In the final embodiment of this invention, a method is provided to convert sodium- or lithium-borate ($NaBO_2$ or $LiBO_2$) to sodium- or lithium-borohydride and also their production using borates, magnesium, water and hydrogen.

In the last two embodiments of this invention, advantage is taken of the integration of the hydride synthesis process with currently operating or future coal-burning plants; thus saving costs and providing carbon sequestration. However, the process described in each embodiment can be carried out independently of the power plants.

BRIEF DESCRIPTION OF THE DRAWINGS

The purpose of this invention and the tremendous advantages it entails for reduction in global warming gases needs to be fully understood from the study of the description along with the drawings wherein:

FIG. 1 shows the moles of hydrogen and sodium carbonate produced when sodium hydroxide and carbon monoxide are allowed to react. The carbon monoxide is presumably generated in a coal-burning process providing heat to another manufacturing process, e.g. synthesis of cement;

FIG. 2 shows in two parts a comparison of the calculated equilibrium compositions, which are easily verified in experiments. FIG. 2A is a well known phase diagram showing the carbon-water system in a gasifier where hydrogen and CO mixture is produced up to very high temperatures. This diagram is included here to show a comparison with the reaction adopted in the present invention shown in FIG. 2B. The temperature of hydrogen production is much lowered and the gas is pure hydrogen.

FIG. 3 shows that in absence of an industrial source of carbon-oxygen gases, this invention provides for the production of hydrogen from water, carbon and sodium hydroxide reaction with no emission of C—O gases. FIG. 3A. Calculated results.

DETAILED DESCRIPTION OF THE PREFERRED EMBODIMENTS

Figure 3B:
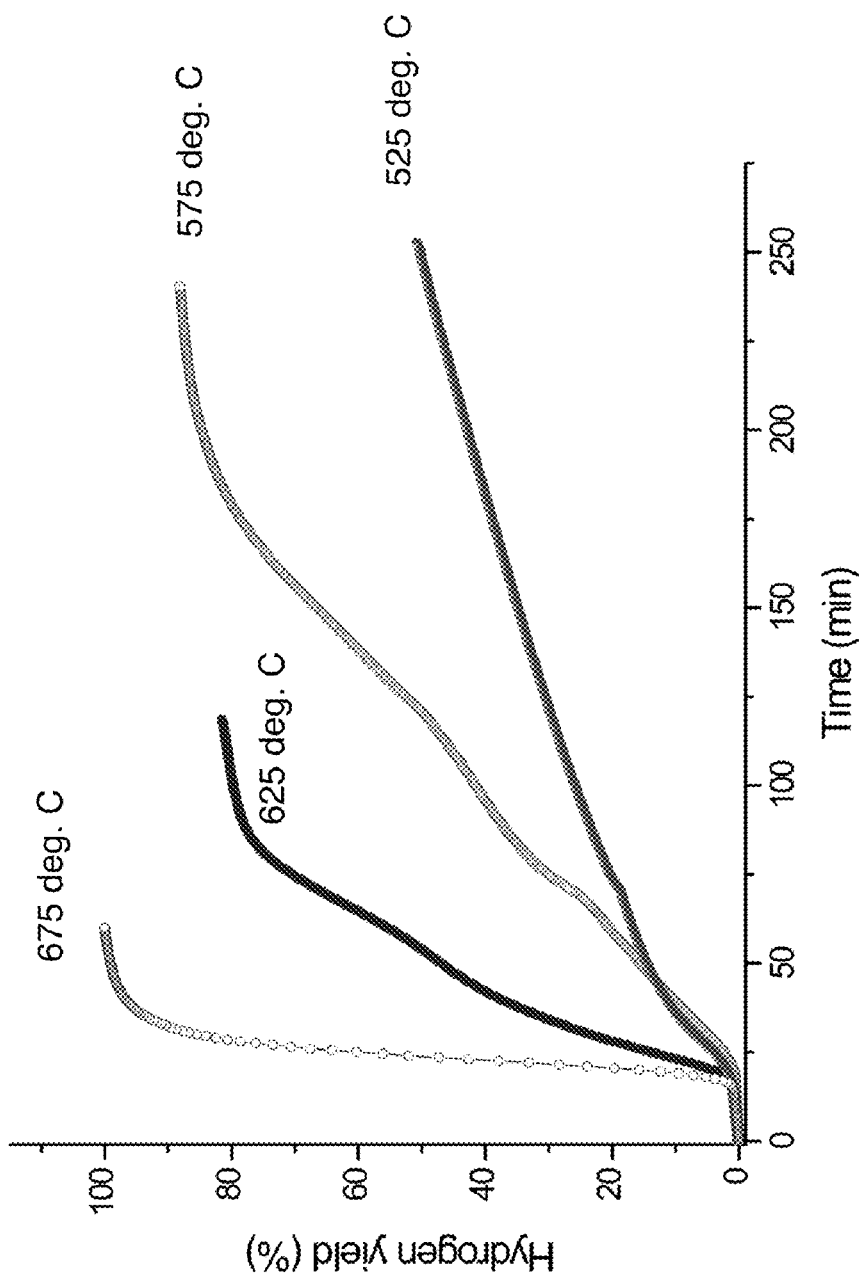
FIG. 3B. The mixture of NaOH and C was heated from 25° C. to 700° C. and the polythermal results of hydrogen production are shown.
Figure 3C:
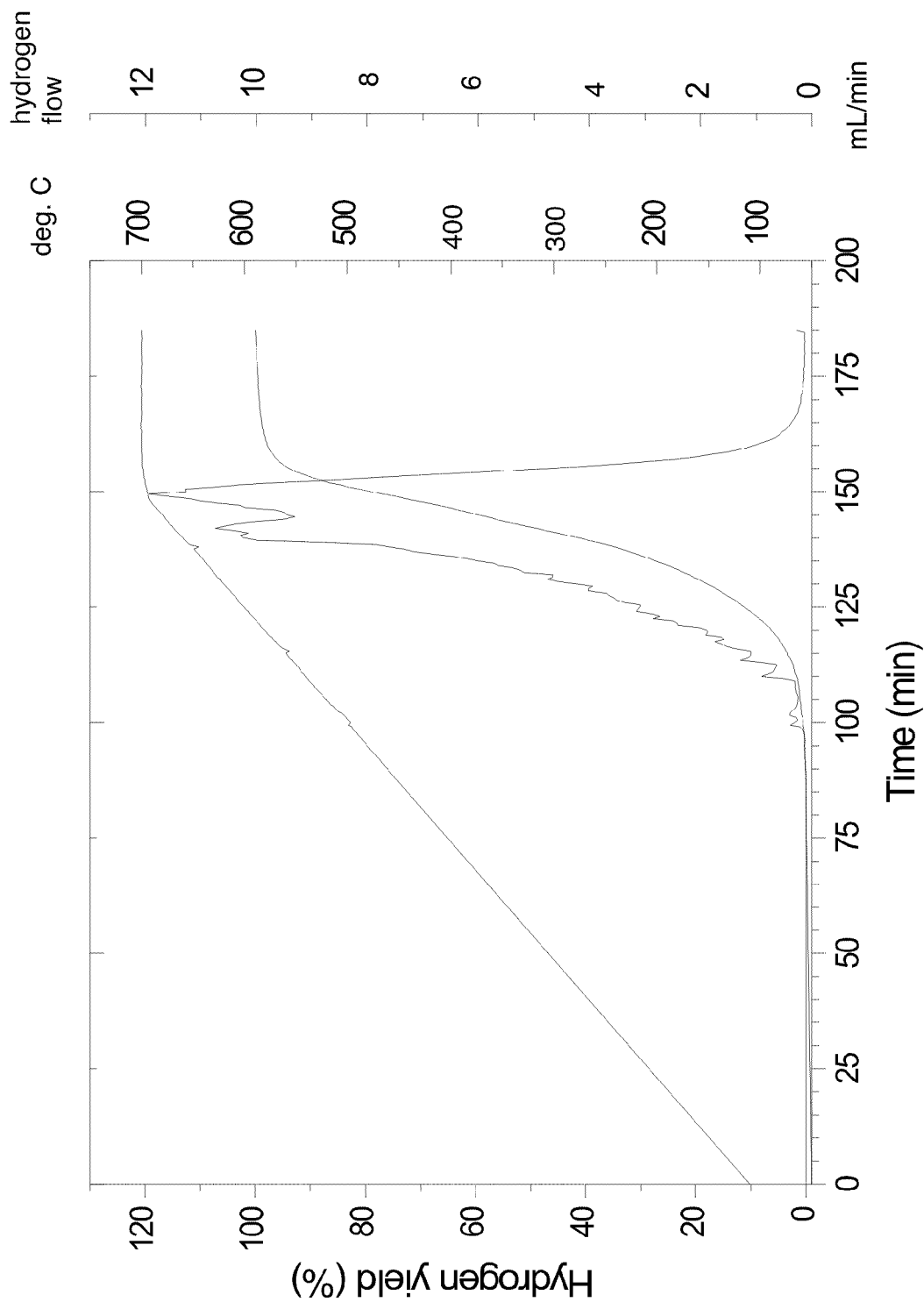
FIG. 3C. The same mixture heated isothermally at 525, 575, 625 and 675° C.

The present invention provides a novel method of producing hydrogen with carbon sequestration; the novelty lies in the fact that gases produced in a coal-burning plant are used both for the energy and for the substance to react with sodium hydroxide reducing the cost simultaneously with eliminating the emission. If we further couple the metal hydride producing reaction with the above reactor system, we can also reduce the cost of metal hydrides for automobile use.

Hydrogen Production

We may use the following reactions:

2NaOH (c)+CO(g)=$Na_2CO_3$ (c)+$H_2$(g) $\Delta H$=−1.19E5 J (600 K)

4NaOH (c)+C (c)+$CO_2$(g)=2$Na_2CO_3$(c)+2 $H_2$(g) $\Delta H$=−6.62 E4 (600 K)

2NaOH (c)+C(c)+$H_2O$(l)=$Na_2CO_3$(c)+2 $H_2$(g) $\Delta H$=6.458 E4 (600 K)

3NaOH (c)+C(c)=$Na_2CO_3$(C)+Na+1.5 $H_2$ $\Delta H$=−2.52E5 J (1100 K)

Reactions (1) and (2) are exothermic. Reaction (2) can be considered as a combination of the Boudouard reaction:

C+$CO_2$=2 CO and reaction (1). Reaction (2) may also be considered as a combination of 2NaOH+$CO_2$=$Na_2CO_3$+$H_2O$ and
2NaOH+C+$H_2O$=$Na_2CO_3$+2 $H_2$ Process 1: Use of CO From Coal Burning CO is not produced in coal burning because high ratio of air to coal is used. However if the heating requirement for the plant is fully met with a lower ratio such that CO is actually produced in some quantity, we could use the CO for producing hydrogen according to the following reaction (1) 2NaOH+CO=$Na_2CO_3$+$H_2$ If NaOH costs 42 cents per kg and $Na_2CO_3$ sells for 36 cents per kg, the hydrogen cost will be only the cost of the energy for this exothermic reaction, which would be an excellent value.

An equilibrium calculation in FIG. 1 shows that $Na_2CO_3$ also known as soda ash and hydrogen are produced over a wide temperature range starting from 400 to 1100 K. The reaction kinetics may be improved by use of a catalyst such $SiO_2$ and/or continuous stirring as described later.

However, if we switch to coal-burning plant design that produces significant CO, we will have to burn more coal for the same thermal effect as can be seen by calculating at 1000 K C+Air ($N_2$ 4,$O_2$ 1 mole)=CO2, $\Delta H$=−2.746E5 J C+Air ($N_2$ 2, $O_2$ 0.5 mole)=0.763 CO+0.118 $CO_2$+0.12 C, $\Delta H$=−6.628E4 J A comparison of $\Delta H$ shows that 4 times heat is produced when $CO_2$ is maximized. Thus in order to maximize CO, we will have to burn 4 times carbon; since in doing so, we will produce as much more hydrogen and $Na_2CO_3$, the economics would not change.

Process 2: Use of $CO_2$ From Coal-Burning Plant

For existing power stations, where $CO_2$ is produced, we may choose another alternative and use $CO_2$ to react with water and Sodium hydroxide according to the reaction:

(2) 4NaOH+C+$CO_2$=$Na_2CO_3$+2$H_2$

One may compare this reaction with the combination of the gasifier reaction C+2$H_2O$=$CO_2$+2$H_2$ and the $CO_2$ absorbing reaction 2NaOH+$CO_2$=$Na_2CO_3$+$H_2O$ to accomplish similar result. It is shown in FIG. 2 (A and B) that the reaction (3) has definite advantage being the carbon-sequester and hydrogen producing reaction. The reaction kinetics may be improved by use of a catalyst such $SiO_2$ and/or continuous stirring as described later.

A comparison of the two figures shows that much higher temperature is required to obtain a significant amount of hydrogen mixed with CO in FIG. 2A than is required when using reaction (2) (FIG. 2B).

Process 3: Hydrogen Generation Without Input of CO or $CO_2$

We may consider reaction (3), if CO or $CO_2$ are not available from an industrial plant:

(3) 2 NaOH+C+$H_2O$=$Na_2CO_3$+2 $H_2$

While this is an endothermic reaction, less amount of solids are required to produce the same amount of hydrogen. This may be helpful if the cost structure of the sodium compound alters in time. In this process 20 kg of NaOH will yield 26.5 kg of $Na_2CO_3$ for each 1 kg of hydrogen. Reaction (3) was considered by Saxena et al. (25) followed by Ishida et al. (26). However, this is the first demonstration that the process is cost effective (see below). FIG. 3A shows the equilibrium calculated results while FIG. 3B and C show the experimental results.

Hydrogen Production Details

Figure 4:
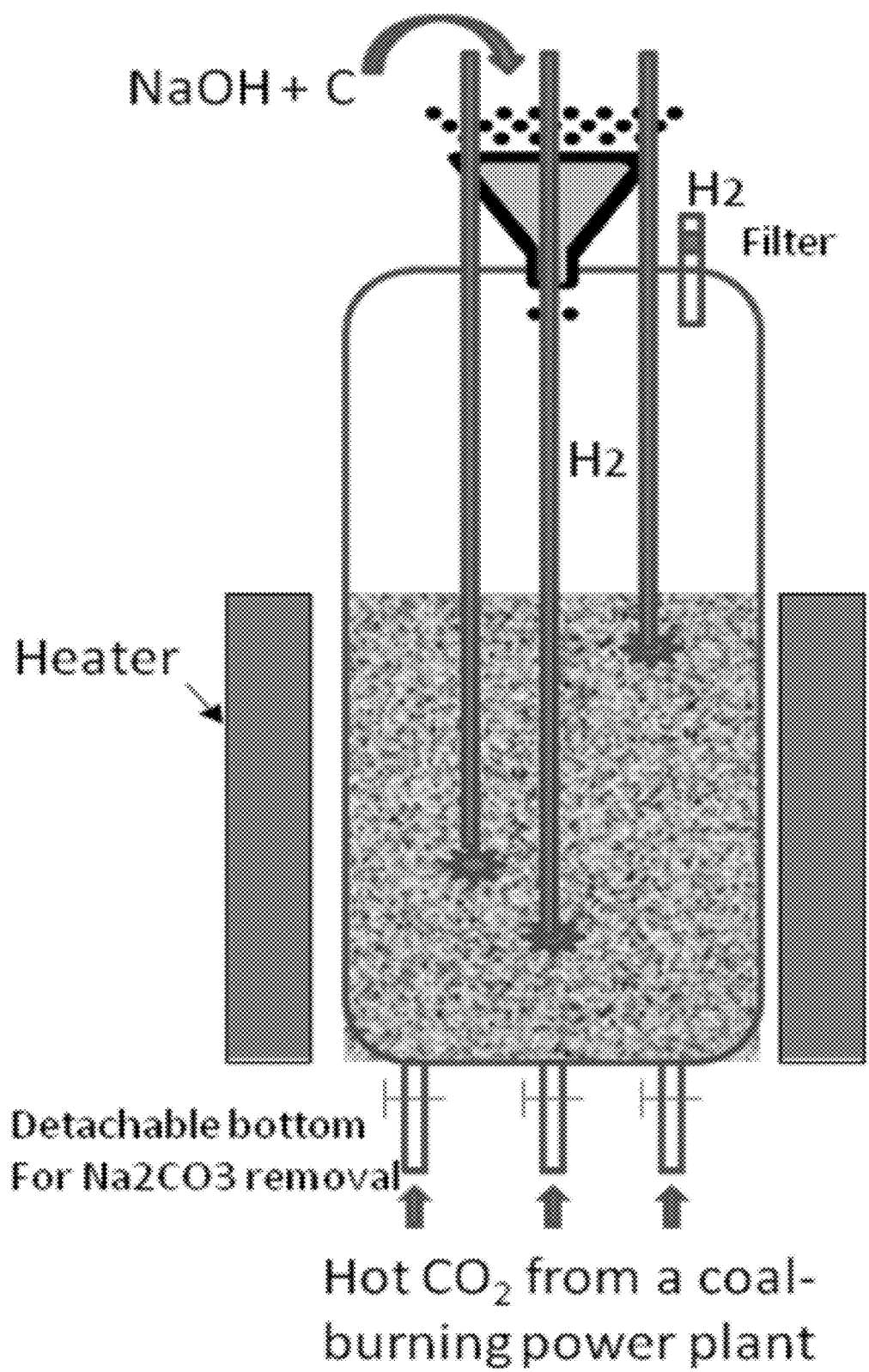
FIG. 4 shows a possible method of hydrogen production. The stirred mixture of sodium hydroxide is reacted with $CO_2$ from coal-burning and C and heated to 800 K with heat contributions from hot hydrogen, hot $CO_2$ and hot air from the power plant. The reaction kinetics may be improved by use of a catalyst such $SiO_2$ and/or continuous stirring as shown in the figure.

FIG. 4 shows one possible construction of a plant comprising of a ceramic-lined steel cylinder. Engineering designs of various types may be possible. In this container, a mixture of NaOH: pulverized coal in 43:12 ratio by weight is introduced. Hot $CO_2$ from the power plant is entered from one end. The solid mixture is continually stirred with heating partly provided by the hot air from the coal-burning plant and partly by other heaters until all NaOH is converted to $Na_2CO_3$ and $H_2$. The exit gases are monitored for the $CO_2$ and the flow rate is adjusted accordingly. Reaction (1) may be similarly carried out and no carbon will be needed. Catalysis of the reactions, where coal is involved may be needed and has been discussed in detail in literature (17) (e.g. Probstein and Hicks, 2006). A high production rate would result if the hydrogen is formed by continuous flow processes. As envisaged here, the reactor is a closed system with a complete conversion of fixed ratio of reactants and production of the carbonate and hydrogen.

Catalysis and partial conversion of the reactants will affect the costs.

The Cost Analysis

Figure 5:
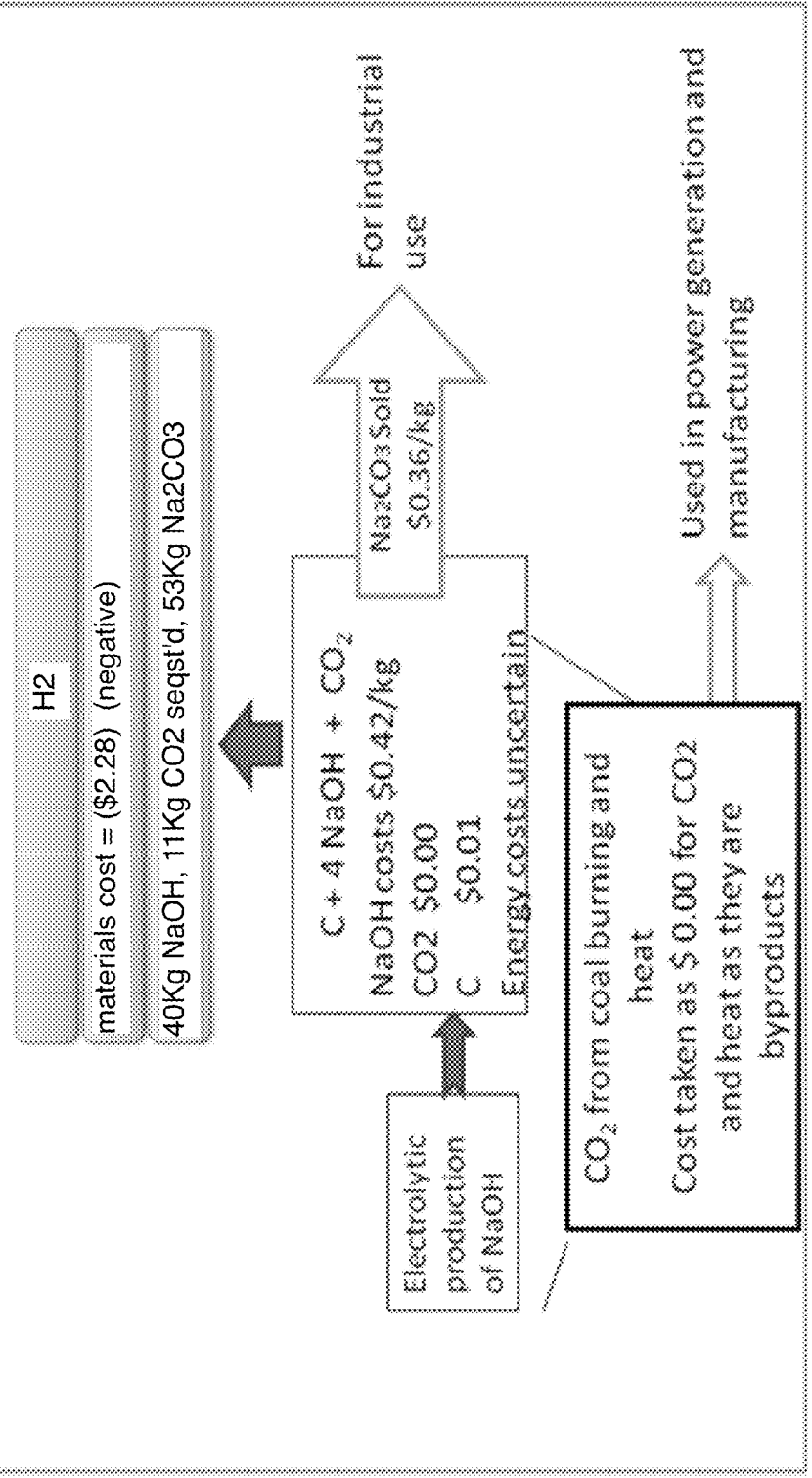
FIG. 5 shows the cost of hydrogen production with carbon sequestration. The analysis depends on the current price structure of sodium products. Any reaction hydrogen producing reaction discussed in the text can be used with this arrangement.

FIG. 5 and Table 1 show the cost analysis. Through reaction (2), we will sequester 11 kg of CO2 for every 43 kg of sodium hydroxide producing 1 kg of hydrogen and 53 kg of sodium carbonate. If we accept the following per kg prices:

If we accept the per kg prices in Table 1, there is an advantage in offsetting the energy costs. The new hydrogen DOE cost goal of $2.00-3.00/gge (delivered, untaxed, 2005$, by 2015) is independent of the pathway used to produce and deliver hydrogen. Better cost calculations are needed to insure the economic viability of the project. Note that less energy is required to electrolyze sodium chloride to produce sodium hydroxide than to produce sodium. It will be necessary to integrate the production of NaOH at the power plants instead of purchasing it from an outside manufacturer. In-house sodium hydroxide manufacturing will provide significant shipping cost savings, efficient process integration, and safety. There are many uses of $Na_2CO_3$ and as long as the use does not release the $CO_2$ to the atmosphere, the carbon sequestration remains effective.

billion tons. World-wide industrial nations were responsible for 3790 million metric tons of $CO_2$ (Kyoto-Related Fossil-fuel totals). It is clearly not practical to consider that we can sequester all this carbon with reaction (2) which would require production of NaOH on a massive scale which would cause further emission of $CO_2$ if fossil fuel is used in the production. However in all situations where industry is producing carbon gases and heat anyway, the production of hydrogen according to the reactions presented here, would lead to reduction of carbon in the atmosphere. Most benefit will be obtained if non-fossil sources of energy (hydroelectricity, nuclear-energy, solar and wind) are used for NaOH production.

More than 100 Mt C/yr are vented to the atmosphere as part of the global production of roughly 38 Mt of hydrogen per year. Through reaction (2), we will sequester 3 Mt carbon (11 Mt of $CO_2$) for every 40 Mt of sodium hydroxide producing 1 Mt of hydrogen and 53 Mt of sodium carbonate. The US production of NaOH is currently 16 Mt per year. 1300 Mt of NaOH will be needed to sequester all the carbon which is currently emitted in hydrogen production. In this process 33 Mt of $H_2$ will result. Sodium hydroxide is produced (along with chlorine and hydrogen) via the chloralkali process. This

TABLE 1

Materials cost calculated assuming equilibrium compositions

| Solid | $Cost/Kg | Source | $CO_2$ sequestered/ Kg of $H_2$ produced | Solid Reactant Per Kg $H_2$ | Solid Product Per Kg $H_2$ |
|---|---|---|---|---|---|
| NaOH | 0.18 | The innovation-Group | | | |
| $Na_2CO_3$ | 0.187 | USGS | | | |
| Na | 3.50 | | | | |
| Coal | 0.06 | Titan-America | | | |
| $H_2$ from coal | 1.04 | | 0.0 | | |
| $H_2$ from natural gas | 3.52 | | 0.0 | | |
| $H_2$ (Reaction 3) | −(1.36)* | | Zero emission | NaOH, 20 | $Na_2CO_3$, 26.5 |
| H2 (Reaction 4) | −(26) | | Zero emission | NaOH, 40 | $Na_2CO_3$, 35 + Na, 7.7 |
| $H_2$ (Reaction 1) | −(2.72)* | | 14 Kg CO | NaOH, 40 | $Na_2CO_3$, 53 |
| $H_2$ (Reaction 2) | −(2.72)* | | 11 Kg $CO_2$ | NaOH, 40 | $Na_2CO_3$, 53 |

*Materials cost only; Cost of energy and other production cost not included.

The analysis depends on the current price structure of sodium products.

We may also consider the following reaction to use sodium carbonate gainfully:

$Na_2CO_3(cr) + 2\ C\ (graphite) = 2\ Na\ (g) + 3\ CO\ (g)$ (5)

This reaction is endothermic with H of 1.16E6 J/mol and is largely complete around 1400 K. Since we rely on coal to provide the heat, the energy cost is not an issue. If we use this reaction to reduce the amount of sodium carbonate produced in reactions (1)-(4), we will further decrease the dependence on the selling price of $Na_2CO_3$.

Part 2: Reduction in $CO_2$ Emission

United States tops in $CO_2$-emissions per capita; in 2003, 121.3 metric tons of $CO_2$ were released in the atmosphere. In 2004 the total carbon release in North America was 1.82 involves the electrolysis of an aqueous solution of sodium chloride. The sodium hydroxide builds up at the cathode, where water is reduced to hydrogen gas and hydroxide ion. The total $H_2$ produced in these reactions (reactions 1, 2 and electrolysis) if used in automobiles and other energy devices will have a very large effect on $CO_2$-emission.

We should also consider the possibility of simply removing the $CO_2$ emission by the reaction:

$2NaOH + CO_2 = Na_2CO_3 + H_2O$

In this process, 1 kg of $CO_2$ will be removed as 2.41 kg of sodium carbonate consuming 1.818 kg of NaOH. We will gain 11 cents per kg of $CO_2$ removal in material costs. The energy cost is separate. This is all based on the prices remaining at this level.

What is proposed here depends critically on maintaining the cost difference between $Na_2CO_3$ and NaOH at the current level.

Part 3: Hydride Production

With the availability of hydrogen already at a high temperature (hydrogen has the same heat capacity as air), we may use the hot gas in any innovative use in producing a hydride.

Synthesis of $MgH_2$

A direct reaction such as:

$Mg+H_2=MgH_2 (\Delta H=-7.22E4, 400\ K)$ may be used; methods of activating a metal for reaction with hydrogen has been described amply in literature (1-7) e.g. for Mg by McClane et al.(1). With the hot $H_2$ provided in the present set up, there will be a further reduction in the cost of $MgH_2$ as is used in the Safe Hydrogen Method (1).

Two other methods are proposed here which take the advantage of the available hot hydrogen. In the first method, $MgH_2$ is synthesized as follows:

$3\ Mg+H_2O+H_2=2\ MgH_2+MgO\ (\Delta H=-4.56E5, 400\ K)$

The addition of water promotes the above reaction to proceed forward vigorously.

Recycling of Sodium- or Lithium-Borohydride from $NaBO_2$ or $LiBO_2$

A method to produce hydrogen on board using a borohydride and methods to synthesize it have been discussed in literature (8-15). Millenium Cell Inc (16) has demonstrated the use of $NaBH_4$ in fuel-cells which may be usable for running small devices as well as automobiles. For sodium borohydride to be widely utilized as an energy storage medium for hydrogen, the cost must be reduced by at least an order of magnitude from its present price. We propose the following set of reactions to solve this problem:

$NaBO_2+4Mg+2H_2O=NaBH_4+4MgO$
($\Delta H,\ 300\ K=-1.04E6$ to $\Delta H, 800\ K=-8.95\ Kj$)
$LiBO_2+4\ Mg+2\ H_2O=LiBH_4+4\ MgO$
($\Delta H,\ 300\ K=-9.92E5$ to $\Delta H, 600\ K=-9.11\ Kj$)

The sodium compound can be synthesized over 300 to 800 K, while the lithium compound over 300 to 600 K. Both of these reactions can be modified considering that $H_2$ is produced cheaply as discussed in this document as follows:

$NaBO_2+3\ Mg+1\ H_2O+1\ H_2=NaBH_4+3\ MgO\ (\Delta H=-6.9\ Kj, 600\ K)$,
$LiBO_2+3\ Mg+1\ H_2O+1\ H_2=LiBH_4+3\ MgO\ (\Delta H=-6.5\ Kj, 600\ K)$, thereby reducing the amount of MgO to be processed.

Since $NaBO_2$ or $LiBO2$ is the product in the hydrolysis reaction:

$Na/LiBH_4+2\ H_2O=Na/LiBO_2\ (aq)+4\ H_2$ the major cost is for the reduction of MgO to Mg, which is discussed by Saxena et al. (18). They studied the reaction $2Mg+H_2O$ producing $MgH_2$ and MgO or $Mg(OH)_2$. With the possible recycling of MgO using the SOM process [19], the cost of producing the hydride will be substantially reduced. The energy costs (which in this case since the reaction is exothermic and we may be able to use hot $H_2$ (FIG. 4) as well as hot air from coal-burning power plants as used for electric generation or for manufacturing industrial products such as cement (FIG. 4-5)), the energy cost can be minimized.

Hydride Production Details

Figure 6:
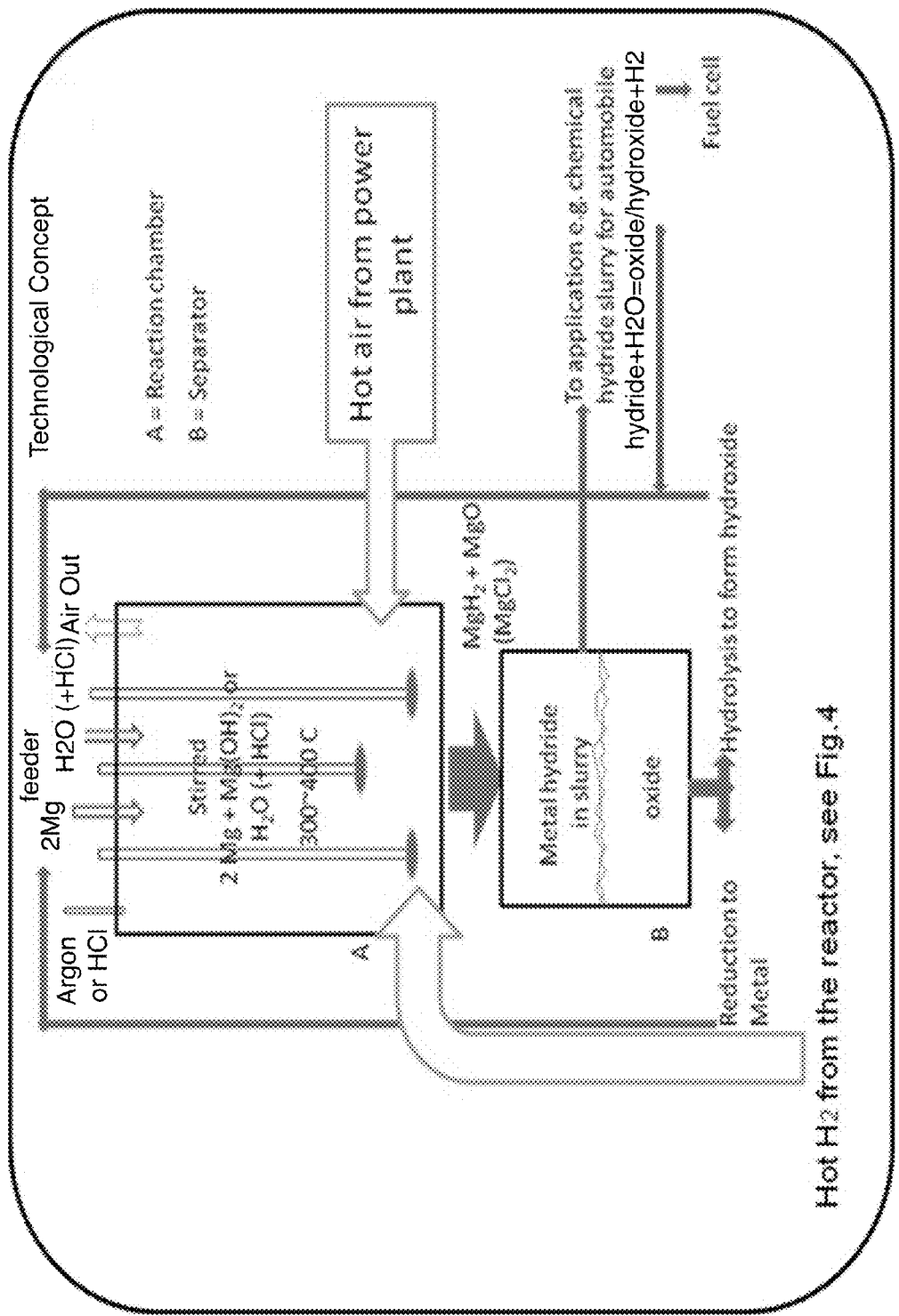
FIG. 6 shows that the synthesis of a hydride using metal+water+heated $H_2$ is accomplished in this reactor which may be heated using hot air exhausted from a power plant according to this invention.

FIG. 6 shows that the synthesis of a hydride using metal+water+heated $H_2$ is accomplished in this reactor which may be heated using hot air exhausted from a power plant according to this invention. Freshly powdered metal is used with water and the newly produced hydrogen from the reactor is used for the production.

RELATED REFERENCES

Andrew W. McClaine, Kenneth Brown, Sigmar Tullmann, Chemical Hydride Slurry for Hydrogen Production and Storage, DOE Hydrogen Program 2 FY 2006 Annual Progress Report.

A. W. McClaine, S. Tullman and K. Brown: Chemical hydrogen slurry for hydrogen production and storage. FY 2005 Progress Report: DOE hydrogen program.

A. W. McClaine, R. W. Breault, C. Larsen, R. Konduri, J. Rolfe, F. Becker and G. Miskolczy, Proceedings of the 2000 U.S. DOE Hydrogen Program Review NREL/CP-570-28890.

M. Klanchar, B. D. Wintrode, J. Phillips, Energy & Fuels, 11, 931-935 (1997).

L. P. Cook, E. R. Plante, NBSIR 85-3282: National Bureau of Standards: Gaithersburg, Md., (1985).

J. Besson, W. Muller, Compt. Rend., 247, 1869-1872, (1958).

S. H. Chan, C. C. Tan, Combust. Flame, 88, 123-136 (1992).

Hurd, D. T. "The Preparation of Boron Hydrides by the Reduction of Boron Halides" *J. Am. Chem. Soc.,* 1949, 71, 20-22.

Amendola S C, Sharp-Goldman S L, Janjua M S, Spencer M S, Kelly M T, Petillo P J, Binder M. Int J Hydrogen Energy 2000; 25:969-75.

Amendola S C, Sharp-Goldman S L, Janjua M S, Spencer N S, Kelly M T, Petillo P J, Binder M. J Power Sources 2000; 85:186-9.

Kojima Y., Haga T. Int J Hydrogen Energy 2003; 28:989-93.

Holzmann, R. T., Ed. *Production of the Boranes and Related Research*; Academic Press: New York, 1967.

King, A. J. "A New Method for the Preparation of Borohydrides" *J. Am. Chem. Soc.,* 1956, 78, 4176-4176.

Schlesinger, H. I.; Brown, H. C.; Finholt, A. E. "The Preparation of Sodium Borohydride by the High Temperature Reaction of Sodium Hydride with Borate Esters" *J. Am. Chem. Soc.,* 1953, 75, 205-209.

Li, Z. P.; Morigazaki, N.; Liu, B. H.; Suda, S. "Preparation of Sodium Borohydride by the Reaction of $MgH_2$ with Dehydrated Borax through Ball Milling at Room Temperature" *J. Alloys Compd.,* 2003, 349, 232-236.

Wu, Y. Process for the regeneration of sodium borate to sodium borohydride for use as hydrogen storage source. Report 2005, Contract ID #: DE-FC36-04GO14008.

Probstein, R. F. and Hicks, R. E. Synthetic fuels, Dover, N.Y., 2006.

S. K. Saxena, Vadym Drozd and Andriy Durygin, Synthesis of metal hydride from water. *International Journal of Hydrogen Energy, In Press* on-line, March 2007.

Uday B. Pal and Adam Powell, "Solid Oxide Membrane Technology (SOM) for Electrometallurgy", J. of Metals, 59(5), 2007, p. 44.

Gupta, H.; Mahesh, I.; Bartev, S.; Fan, L. S. *Enhanced Hydrogen Production Integrated with CO2 Separation in a Single-Stage Reactor*; DOE Contract No: DE-FC26-03NT41853, Department of Chemical and Biomolecular Engineering, Ohio State University: Columbus, Ohio, 2004.

Ziock, H-J.; Lackner, K. S.; Harrison, D. P. Zero Emission Coal Power, a New Concept. *Proceedings of the First National Conference on Carbon Sequestration*, Washington, D.C., May 15-17, 2001.

Rizeq, G.; West, J.; Frydman, A.; Subia, R.; Kumar, R.; Zamansky, V.; Loreth, H.; Stonawski, L.; Wiltowski, T.; Hippo, E.; Lalvani, S. *Fuel-Flexible Gasification-Combustion Technology for Production of H2 and Sequestration-*

Ready CO2; Annual Technical Progress Report 2003, DOE Award No. DE-FC26-00FT40974. GE Global Research: Irvine, Calif., 2003.

"The Hydrogen Economy: Opportunities, Costs, Barriers, and R&D Needs (2004)," *Carbon Emissions Associated with Current Hydrogen Production*: "National Academy of Engineering (NAE), Board on Energy and Environmental Systems (BEES).

Xu, X, Xiao, Y. and Quaio, C. System design and analysis of a direct hydrogen from coal system with CO2 capture. Energy & Fuels 2007, 21, 1688-1694.

Saxena, S. K. Hydrogen production by chemically reacting species. Int. J. Hydrogen Energy 2003, 28, 49.

Ishida, M., Toida, M., Shimizu, T., Takenaka, S. and Otsuka, K. Formation of hydrogen without $CO_x$ from carbon, water and alkali hydroxide, Ind. Eng. Chem. Res. 2004, 43, 7204-7206.

The references recited here are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A process to synthesize metal hydride comprising:
   a) reacting a metal hydroxide selected from sodium hydroxide or potassium hydroxide with a carbon reaction group at about 400K to 1100K in the presence of a silicon dioxide catalyst to obtain hydrogen and a carbonate compound,
   wherein the carbonate compound is sodium carbonate when sodium hydroxide is used and wherein the carbonate compound is potassium carbonate when potassium hydroxide is used,
   wherein the carbon reaction group is selected from the group consisting of: carbon monoxide; carbon dioxide and elemental carbon; and elemental carbon and water;
   b) recycling the carbonate compound of the hydrogen production reaction by reacting the carbonate compound with elemental carbon to produce sodium and carbon monoxide where the carbonate compound is sodium carbonate, and to produce potassium and carbon monoxide where the carbonate compound is potassium carbonate;
   c) reacting said hydrogen with a hydride reaction group to obtain a metal hydride, wherein said hydride reaction group is selected from the group consisting of:
   magnesium metal powder to produce magnesium hydride;
   magnesium metal powder and water to produce magnesium hydride;
   sodium metaborate and magnesium metal powder to produce sodium borohydride;
   sodium metaborate, water, and magnesium metal powder to produce sodium borohydride;
   lithium metaborate, water, and magnesium metal powder to produce lithium borohydride; and
   lithium metaborate and magnesium metal powder to produce lithium borohydride,
   wherein the reaction temperature in Step 1c for reactions involving magnesium metal powder to produce magnesium hydride is about 400K, wherein the reaction temperature in Step 1c for reactions involving sodium metaborate ranges from about 300K to 800K, and wherein the reaction temperature in Step 1c for reactions involving lithium metaborate ranges from about 300K to 600K.

2. The process according to claim 1, further comprising the preliminary step of obtaining the carbon monoxide or carbon dioxide of step 1a from a coal-burning plant.

3. The process according to claim 1, further comprising the step of obtaining hot air from a coal-burning plant to provide heat required to facilitate the chemical reaction of Step 1a and Step 1b.

4. The process according to claim 1, wherein the metal hydroxide of Step 1a is sodium hydroxide.

5. The process according to claim 1 further comprising wherein the metal hydroxide of Step 1a is potassium hydroxide.

* * * * *